B. Illingworth,
Cage Trap.
No 70,093.           Patented Oct. 22, 1867.
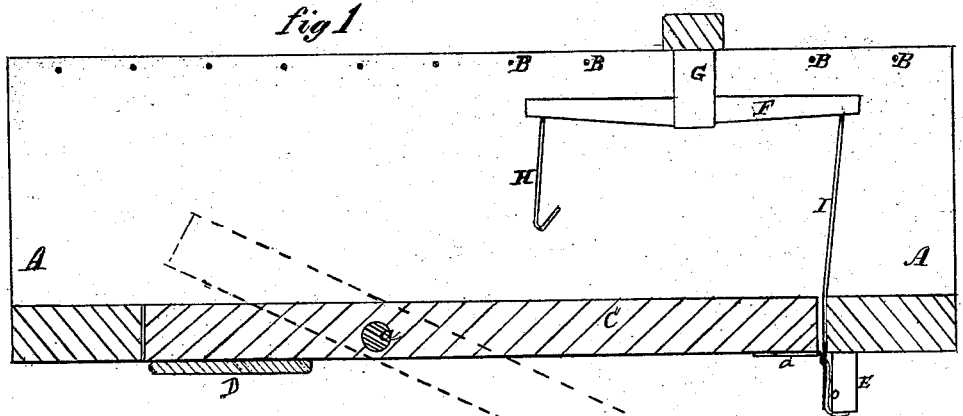
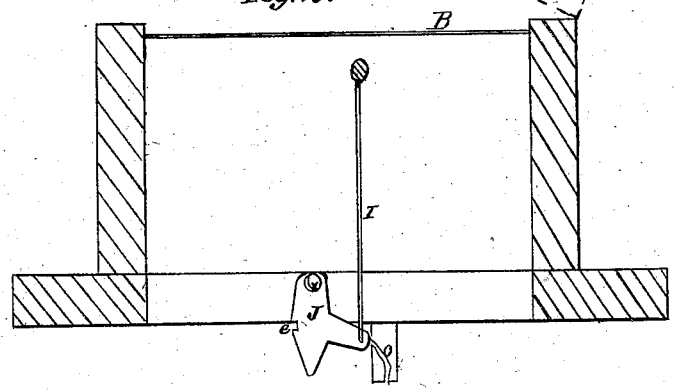
Witnesses.           Inventor:

United States Patent Office

B. ILLINGWORTH, OF FREEPORT, ILLINOIS.

Letters Patent No. 70,093, dated October 22, 1867.

IMPROVED ANIMAL TRAP.

*The Schedule referred to in these Letters Patent and making part of the same.*

TO ALL WHOM IT MAY CONCERN:

Be it known that I, B. ILLINGWORTH, of Freeport, in the State of Illinois, have invented certain new and useful improvements in Animal Traps; and do hereby declare that the following is a full, clear, and exact description thereof, reference being had to the accompanying drawings, and to the letters of reference marked thereon.

In the annexed drawings, making part of this specification, A represents a rectangular box with open ends, and its top covered over with wires, which are placed a suitable distance apart, so as not to allow of the escape of an animal in this direction when it has once entered the box. An opening is cut through the bottom of the box, and within this opening is placed and pivoted a door or platform, C. This door is pivoted at $a$, back of its centre, and is provided on its under side and rear with a weight, D. The forward end of this door is allowed to fall below the bottom of the box, and is provided on its under side with a metallic plate or strip, $d$. J represents an irregular-shaped latch-plate, which is pivoted to the box at one end of the opening in it. This plate is provided with a notch, $e$, and an arm, to which is connected a rod, I. The upper end of rod I is secured to one end of a bar, F, which said bar is pivoted at its centre to an arm, G, which projects downward from the under side of a piece which lies across the top of the box. To the other end of bar F is secured a rod, H, which is provided with a hook at its lower end, to which the bait is secured. $o$ represents a spring, one end of which is secured to the arm of plate J, to which the rod I is attached, and the other end to a stud, E, which projects from the under side of the box.

The box A is to be placed over a barrel or box, or vessel of any kind, to receive and retain the animals when caught. This trap is self-setting. When the door C is closed up the plate $d$ upon its under side is caught by the notch $e$ of the latch-plate J. The bait being secured to the hook on rod H, the animal passes into the box to take it, and, in pulling at it, disengages the plate J from the plate $e$ by means of rod I. When this takes place the weight of the animal bears down the door, and he is precipitated into the vessel beneath. The weight D causes the forward end of the door to fly up, so as to set it again.

Having thus fully described my invention, what I claim is—

The arrangement of the box A, as constructed with the door C, plate J, spring $o$, bar F, and rods H and I, the several parts operating in the manner and for the purpose set forth.

In testimony that I claim the foregoing I have hereunto set my hand this 5th day of June, 1867.

B. ILLINGWORTH.

Witnesses:
    J. N. PROUTY,
    C. C. SHULER.